(12) United States Patent
Hannay et al.

(10) Patent No.: US 7,947,782 B2
(45) Date of Patent: May 24, 2011

(54) MICROGEL-CONTAINING VULCANISABLE COMPOSITION

(75) Inventors: Judy E. Hannay, Beaumont, TX (US); Thomas Früh, Limburgerhof (DE); Werner Obrecht, Moers (DE)

(73) Assignees: Rhein Chemie Rheinau GmbH, Mannheim (DE); LANXESS Deutschland GmbH, Leverkusen (DE); LANXESS Inc., Sarnia, ON (CA)

( * ) Notice: Subject to any disclaimer, the term of this patent is extended or adjusted under 35 U.S.C. 154(b) by 537 days.

(21) Appl. No.: 11/433,978

(22) Filed: May 15, 2006

(65) Prior Publication Data
US 2006/0254734 A1    Nov. 16, 2006

Related U.S. Application Data

(60) Provisional application No. 60/681,311, filed on May 16, 2005.

(30) Foreign Application Priority Data

May 16, 2005 (DE) .......................... 10 2005 023 213

(51) Int. Cl.
| C08L 9/00 | (2006.01) |
| C08L 9/02 | (2006.01) |
| C08L 23/04 | (2006.01) |
| C08L 25/02 | (2006.01) |
| C08L 27/04 | (2006.01) |
| C08L 27/12 | (2006.01) |
| C08L 33/04 | (2006.01) |
| C08L 33/06 | (2006.01) |
| C08L 33/14 | (2006.01) |
| C08L 33/18 | (2006.01) |
| C08L 45/00 | (2006.01) |

(52) U.S. Cl. ........ 525/199; 525/211; 525/213; 525/222; 525/227; 525/232; 525/233; 525/238; 525/240; 525/241

(58) Field of Classification Search .......... 525/199, 525/211, 213, 222, 227, 232, 233, 238, 240, 525/241
See application file for complete search history.

(56) References Cited

U.S. PATENT DOCUMENTS

| 4,683,257 A | 7/1987 | Kakiuchi et al. ............ 524/432 |
| 4,715,607 A | 12/1987 | Llort et al. ................. 273/218 |
| 4,955,613 A | 9/1990 | Gendreau et al. ............ 273/218 |
| 5,124,408 A | 6/1992 | Engels et al. ................ 525/215 |
| 5,302,696 A | 4/1994 | Schiessl ...................... 528/487 |
| 5,395,891 A | 3/1995 | Obrecht et al. .............. 525/194 |
| 5,442,009 A | 8/1995 | Parker et al. ................ 524/555 |
| 5,836,831 A | 11/1998 | Stanton et al. .............. 473/354 |
| 6,001,930 A | 12/1999 | Rajagopalan .............. 525/92 B |
| 6,127,488 A | 10/2000 | Obrecht et al. ........... 525/333.3 |
| 6,133,364 A | 10/2000 | Obrecht et al. ............. 524/495 |
| 6,184,296 B1 | 2/2001 | Obrecht et al. ............. 525/232 |
| 6,207,757 B1 | 3/2001 | Obrecht et al. ............. 525/194 |
| 6,242,534 B1 | 6/2001 | Obrecht et al. ............. 525/191 |
| 6,372,857 B1 | 4/2002 | Obrecht et al. ........... 525/332.6 |
| 6,399,706 B1 | 6/2002 | Obrecht et al. ............. 525/191 |
| 6,573,346 B1 | 6/2003 | Melchiors et al. ........... 526/217 |
| 6,579,945 B2 | 6/2003 | Obrecht et al. ............. 525/192 |
| 6,620,866 B1 | 9/2003 | Obrecht et al. ............... 524/81 |
| 6,620,886 B2 | 9/2003 | Obrecht et al. ............. 525/191 |
| 6,632,888 B2 | 10/2003 | Obrecht et al. ............. 525/215 |
| 6,649,696 B2 | 11/2003 | Obrecht et al. ............. 525/125 |
| 6,737,478 B2 | 5/2004 | Obrecht et al. ............. 525/133 |
| 6,848,487 B2 * | 2/2005 | Weydert et al. ............. 152/525 |
| 7,135,514 B2 * | 11/2006 | Johansson .................... 524/321 |
| 2001/0006995 A1 * | 7/2001 | Obrecht et al. ............. 525/123 |
| 2001/0051685 A1 * | 12/2001 | Obrecht et al. ............. 524/526 |
| 2002/0082364 A1 | 6/2002 | Obrecht et al. ............. 525/535 |
| 2002/0119837 A1 | 8/2002 | Bissonnette et al. ......... 473/378 |
| 2002/0177661 A1 | 11/2002 | Obrecht et al. ............. 525/125 |
| 2003/0013553 A1 | 1/2003 | Higuchi et al. .............. 473/371 |
| 2006/0252858 A1 | 11/2006 | Obrecht et al. ............. 524/160 |
| 2006/0275690 A1 | 12/2006 | Fessenbecker et al. .. 430/137.15 |
| 2006/0275691 A1 | 12/2006 | Fessenbecker et al. .. 430/137.15 |
| 2007/0135573 A1 | 6/2007 | Ziser et al. .................. 525/119 |
| 2007/0135579 A1 * | 6/2007 | Obrecht et al. ............. 525/233 |
| 2007/0232733 A1 | 10/2007 | Ziser et al. .................. 524/386 |
| 2008/0064768 A1 | 3/2008 | Ziser et al. .................... 516/98 |
| 2008/0249241 A1 | 10/2008 | Heiliger et al. ............... 525/50 |

FOREIGN PATENT DOCUMENTS

| EP | 1 520 732 | 4/2005 |
| GB | 1078400 | 8/1967 |
| JP | 2004180716 | 7/2004 |
| JP | 2004180729 | 7/2004 |
| JP | 2004337231 | 12/2004 |
| WO | 01/52943 | 7/2001 |
| WO | 01/52945 | 7/2001 |
| WO | 01/52947 | 7/2001 |

OTHER PUBLICATIONS

H.G. Elias, Makromolekule, vol. 2,Technologie, 5th Edition, 1992, pp. 99 ff.

* cited by examiner

Primary Examiner — Nathan M Nutter
(74) Attorney, Agent, or Firm — Nicanor A. Kohncke

(57) ABSTRACT

The present invention concerns a vulcanizable composition, vulcanized products produced from it, and their use in particular in the production of golf balls or roll coverings.

29 Claims, No Drawings

MICROGEL-CONTAINING VULCANISABLE COMPOSITION

CLAIM FOR BENEFIT OF EARLIER U.S. EFFECTIVE FILING DATE UNDER 35 U.S.C. 119(E)

This application claims the benefit of U.S. Provisional Application No. 60/681,311 filed on May 16, 2005

BACKGROUND OF THE INVENTION

1. Field of the Invention

The present invention concerns a vulcanisable composition, vulcanised products produced from it, and their use in particular in the production of golf balls, table tennis bat coatings or roll coverings.

2. Description of the Related Art

The use of microgels to control the properties of elastomers is known (e.g. EP-A-405216, DE-A 4220563, GB-PS 1078400, DE 19701487, DE 19701489, DE 19701488, DE 19834804, DE 19834803, DE 19834802, DE 19929347, DE 19939865, DE 19942620, DE 19942614, DE 10021070, DE 10038488, DE 10039749, DE 10052287, DE 10056311 and DE 10061174).

Golf ball formulations conventionally contain high-cis BR rubber, zinc diacrylate or zinc dimethacrylate and peroxide. Golf balls have standardised dimensions (minimum diameter, weight, etc.). Adjustment of the density, for example, to establish the minimum diameter and weight is conventionally carried out with high-density additives such as e.g. barium sulfate, zinc oxide or carbon black. The disadvantage of this procedure is that both processing properties and material properties can undergo undesirable changes.

Such conventional golf ball core formulations are described for example in U.S. Pat. No. 4,715,607, U.S. Pat. No. 4,955,613 (EP-A-0386915), U.S. Pat. No. 5,836,831, U.S. Pat. No. 6,001,930 JP-A-2004180729, JP62089750A2 (U.S. Pat. No. 4,683,257), JP2004337231A2, JP2004180716A2, JP2002355339A2 (US20030013553A1), US20020119837A1, WO0152947A1, WO0152945A1 and WO0152943A1.

The object of the present invention was in particular to further improve the properties of these known compositions.

DESCRIPTION OF THE INVENTION

This patent application demonstrates a way in which, through the use of microgels with a diene rubber (e.g. BR, NBR), in particular metal diacrylates or metal dimethacrylates, a peroxide and optionally further mix components, the processing behaviour and the density of the vulcanised products produced therefrom can be advantageously controlled, without having to accept losses in the material properties such as e.g. impact resilience or rebound height. On the contrary, certain material properties such as tensile strength or elongation at break, for example, are advantageously influenced.

Thus the compositions used according to the invention surprisingly demonstrate advantages in terms of the production process (frequently by injection moulding) for the vulcanised products. Thus the microgel-containing mixtures according to the invention were easier to release from the mould (lower tack), leading to reduced mould contamination in the production process. The microgel-containing compositions according to the invention also allow an unchanged incubation time and an unchanged scorch time (e.g. t10) combined with a shorter complete vulcanisation time (t90 and t95). Advantages also follow in terms of the material properties.

Thus at a given density the microgel-containing mixtures according to the invention make it possible to obtain a high hardness combined with high impact resilience, good mechanical properties (tensile strength and elongation at break) with rapid recovery after mechanical compression, whilst without microgels losses are sustained in some properties. Depending on whether microgels are used as an additive or in a partial exchange with the matrix, the properties can be controlled. This is not the case with the known compositions, because zinc diacrylate and zinc dimethacrylate, for example, have no matrix properties so they always have to be added as an additive. Different microgels also display differing behaviour, for example in terms of impact resilience, in other words they can dampen selectively or alternatively not dampen. In this way the properties of the vulcanised products according to the invention can be selectively controlled by selecting a suitable type of microgel.

The present invention thus provides a vulcanisable composition containing:
 a) at least one diene rubber,
 b) at least one unsaturated carboxylic acid or a salt thereof,
 c) at least one peroxide and
 d) at least one microgel.

The diene rubber is preferably selected from the group consisting of: NR: natural rubber, SIBR: styrene/isoprene/butadiene rubber, BR: polybutadiene rubber, SNBR: styrene/butadiene/acrylonitrile rubber, CR: polychloroprene, ABR: butadiene/acrylic acid C1-4 alkyl ester copolymers, IR: polyisoprene, SBR: random styrene-butadiene copolymers, preferably with styrene contents of 1 to 60, preferably 5 to 50 percent by weight, X-SBR: carboxylated styrene-butadiene copolymers, FKM: fluororubber, ACM: acrylate rubber, NBR: polybutadiene-acrylonitrile copolymers, preferably with acrylonitrile contents of 5 to 60, preferably 10 to 50 percent by weight, X-NBR: carboxylated nitrile rubbers, IIR: isobutylene/isoprene copolymers, preferably with isoprene contents of 0.5 to 10 percent by weight, BIIR: brominated isobutylene/isoprene copolymers, preferably with bromine contents of 0.1 to 10 percent by weight, CIIR: chlorinated isobutylene/isoprene copolymers, preferably with bromine contents of 0.1 to 10 percent by weight, EPM: ethylene/propylene copolymers, EPDM: ethylene-propylene-diene copolymers, EAM: ethylene/acrylate copolymers, EVM: ethylene/vinyl acetate copolymers, CO and ECO: epichlorohydrin rubbers, Q: silicone rubbers, AU: polyester urethane polymers, EU: polyether urethane polymers, ENR: epoxydised natural rubber or mixtures thereof.

The diene rubber is preferably selected from the group consisting of: NR: natural rubber, SBR: styrene/butadiene rubber, SIBR: styrene/isoprene/butadiene rubber, BR: polybutadiene rubber, NBR: nitrile rubber, IIR: butyl rubber, SNBR: styrene/butadiene/acrylonitrile rubber and CR: polychloroprene. The diene rubbers are particularly preferably polybutadiene and/or nitrile rubber.

In applications in which the vulcanisate does not come into contact with an oil-containing medium, as in golf ball cores or table tennis bat coatings for example, the diene rubber polybutadiene with a 1,4-cis content >90% is preferred. These polybutadiene rubbers are produced with the aid of Ziegler catalysts based on Ti, Ni, Co and Nd. Such polybutadiene rubbers and their production are described for example in Ullmann's Encyclopedia of Industrial Chemistry, Rubber, 3. Synthetic (VCH Verlagsgesellschaft mbH, D-69451 Weinheim, 1993).

In applications in which the vulcanisate may come into contact with an oil-containing medium, such as roll coverings for example, nitrile rubbers are preferred. Such nitrile rubbers and their production are described for example in Ullmann's Encyclopedia of Industrial Chemistry, Rubber, 3. Synthetic (VCH Verlagsgesellschaft mbH, D-69451 Weinheim, 1993).

The vulcanisable composition of the invention contains one or more unsaturated carboxylic acids or a salt thereof. This component serves as a co-crosslinker. This is preferably selected from metal diacrylates or metal dimethacrylates. The unsaturated carboxylic acid is preferably an alpha, beta ethylene-unsaturated carboxylic acid having 3 to 8 carbon atoms, such as methacrylic acid, acrylic acid, cinnamic acid and crotonic acid, of which acrylic acid and methacrylic acid are preferred. Suitable metal salts are those of sodium, potassium, magnesium, calcium, zinc, barium, aluminium, tin, zirconium, lithium, of which sodium, zinc and magnesium are preferred. Zinc diacrylate and zinc dimethacrylate are most preferred. In the compositions according to the invention 5 to 70 phr of one or more unsaturated carboxylic acids or the salts thereof are preferably used. Approximately 15 to approximately 50 phr are used in particular. It is also possible according to the invention to incorporate the unsaturated carboxylic acid and a metal oxide into the composition.

The vulcanisable composition of the invention also contains at least one peroxide, which is preferably selected from organic peroxides such as dicumyl peroxide, t-butylcumyl peroxide, bis-(t-butylperoxyisopropyl)benzene, di-t-butyl peroxide, 2,5-dimethylhexane-2,5-dihydroperoxide, 2,5-dimethylhexyne-3,2,5-dihydroperoxide, dibenzoyl peroxide, bis-(2,4-dichlorobenzoyl)peroxide, t-butyl perbenzoate, 4,4-di-(t-butylperoxy)valeric acid butyl ester and 1,1-bis-(t-butylperoxy)-3,3,5-trimethyl cyclohexane, or the peroxides listed below for microgel production can be used. The peroxide is used in a quantity from 0.2 to 10 phr, preferably in a quantity from 0.2 to 5 phr of peroxide.

The vulcanisable composition of the invention preferably has the following composition:
 a) one or more diene rubbers, preferably polybutadiene and/or NBR,
 b) 5 to 70 phr of one or more unsaturated carboxylic acids or salts thereof, preferably zinc diacrylate or zinc dimethacrylate,
 c) 0.2 to 10 phr of one or more peroxides,
 d) 5 to 60 phr of one or more microgels, preferably a BR or SBR microgel, and
 e) 0 to 50 phr of one or more conventional rubber additives, in particular one or more fillers.

Suitable rubber additives include, for example: fillers, such as carbon black, silica, calcium oxide, barium sulfate, titanium dioxide, zinc oxide, peptising agents, stearic acid, accelerators, antiozonants, antioxidants, processing oils, activators, plasticisers, scorch inhibitors, extender oils, etc.

The microgel used in the composition according to the invention is preferably a crosslinked microgel based on homopolymers or random copolymers. The microgels used according to the invention are thus preferably crosslinked homopolymers or crosslinked random copolymers. The terms homopolymers and random copolymers are known to the person skilled in the art and are explained for example in Vollmert, Polymer Chemistry, Springer 1973.

The primary particles of microgel (B) contained in the composition according to the invention preferably have an almost spherical geometry. According to DIN 53206:1992-08, microgel particles that are dispersed in the coherent phase and are recognisable as individuals using suitable physical processes (electron microscope) are defined as primary particles (cf. e.g. Römpp Lexikon, Lacke und Druckfarben, Georg Thieme Verlag, 1998). An "almost spherical" geometry means that when a thin section is viewed with an electron microscope, the dispersed primary particles of the microgels recognisably form a substantially circular area.

In the primary particles of microgel (B) contained in the composition according to the invention, the difference in diameters of an individual primary particle, defined as $$[(d1-d2)/d2] \times 100,$$

wherein d1 and d2 are any two diameters of any section of the primary particle and d1>d2, is preferably less than 250%, more preferably less than 200%, even more preferably less than 100%, even more preferably less than 50%.

Preferably at least 80%, more preferably at least 90%, even more preferably at least 95% of the primary particles of the microgel display a difference in diameters, defined as $$[(d1-d2)/d2] \times 100,$$

wherein d1 and d2 are any two diameters of any section of the primary particle and d1>d2, of less than 250%, more preferably less than 200%, even more preferably less than 100%, even more preferably less than 50%.

The aforementioned difference in diameters of the individual particles is determined by the following method. Firstly a TEM image of a thin section of the composition according to the invention is prepared as described in the examples. Then a transmission electron microscopy image is produced with a magnification of 10000 times to 85000 times. In an area measuring 833.7×828.8 nm the largest and smallest diameters of 10 microgel primary particles are measured manually as d1 and d2. If the difference as defined above in at least 80%, more preferably at least 90%, even more preferably at least 95% of the measured microgel primary particles is less than 250%, more preferably less than 100%, even more preferably less than 80%, even more preferably less than 50%, then the microgel primary particles exhibit the feature of difference as defined above.

If the concentration of microgels in the composition is so high that an extensive superposition of the visible microgel primary particles occurs, the analysability can be improved by prior, appropriate dilution of the measuring sample.

In the composition according to the invention the primary particles of microgel (B) preferably have an average particle diameter of 5 to 500 nm, more preferably 20 to 400, even more preferably 30 to 300, even more preferably 40 to 100 nm (diameters defined in accordance with DIN 53206).

Since the morphology of the microgels does not change substantially during incorporation into the vulcanisable mixture, the average particle diameter of the dispersed primary particles substantially corresponds to the average particle diameter of the microgel used.

In the composition according to the invention the microgels used conveniently exhibit fractions that are insoluble in toluene at 23° C. (gel content) of at least around 70 wt. %, more preferably at least around 80 wt. %, even more preferably at least around 90 wt. %. The fraction that is insoluble in toluene is determined in toluene at 23° C. In this connection 250 mg of the microgel are swollen in 25 ml of toluene for 24 hours with shaking at 23° C. After centrifuging at 20,000 rpm, the insoluble fraction is separated off and dried. The gel content is calculated from the quotient of the dried residue and the original weighed amount and is given as a percentage by weight.

In the composition according to the invention the microgels that are used conveniently exhibit a swelling index in toluene at 23° C. of less than around 80, more preferably less than 60, even more preferably less than 40. The swelling index (Si) of the microgels can thus particularly preferably be between 1 to 30 and 1 to 20. The swelling index is calculated from the weight of the solvent-containing microgel swollen in toluene at 23° C. for 24 hours (after centrifuging at 20,000 rpm) and the weight of the dry microgel:

$$Si = \text{wet weight of microgel/dry weight of microgel.}$$

To determine the swelling index, 250 mg of the microgel are swollen in 25 ml of toluene for 24 hours with shaking. The gel is centrifuged off and weighed and then dried to constant weight at 70° C. and weighed again.

In the composition according to the invention the microgels that are used conveniently have glass transition temperatures Tg of −100° C. to +100° C., more preferably −80° C. to +80° C.

In the composition according to the invention the microgels that are used conveniently have a glass transition range of greater than 5° C., preferably greater than 10° C., more preferably greater than 20° C. Microgels which have such a glass transition range are generally—unlike completely homogeneously radiation-crosslinked microgels—not completely homogeneously crosslinked. This means that the modulus change from the matrix phase to the dispersed phase is not direct. For this reason impact stress does not lead to tearing effects between the matrix and the dispersed phase, as a result of which the mechanical properties, swelling behaviour and stress corrosion cracking, etc., are advantageously influenced.

The glass transition temperature (Tg) and the glass transition temperature range ($\Delta$Tg) of the microgels are determined by means of differential scanning calorimetry (DSC). To determine Tg and $\Delta$Tg two cooling/heating cycles are performed. Tg and $\Delta$Tg are determined in the second heating cycle. For the measurements, 10-12 mg of the selected microgel are placed in a Perkin-Elmer DSC sample container (standard aluminium pan). The first DSC cycle is performed by first cooling the sample with liquid nitrogen to −100° C. and then heating it at a rate of 20 K/min to +150° C. The second DSC cycle is begun by immediately cooling the sample as soon as a sample temperature of +150° C. is reached. Cooling takes place at a rate of approximately 320 K/min. In the second heating cycle the sample is heated again to +150° C. as in the first cycle. The heating rate in the second cycle is again 20 K/min. Tg and $\Delta$Tg are graphically determined on the DSC curve of the second heating operation. For this purpose three straight lines are plotted on the DSC curve. The $1^{st}$ straight line is plotted on the section of the DSC curve below Tg, the $2^{nd}$ straight line on the part of the curve passing through Tg with the turning point and the $3^{rd}$ straight line on the part of the DSC curve above Tg. Three straight lines with two points of intersection are obtained in this way. Each point of intersection is characterised by a characteristic temperature. The glass transition temperature Tg is obtained as the average of these two temperatures and the glass transition range $\Delta$Tg is obtained as the difference between the two temperatures.

The microgels contained in the composition according to the invention can be produced in a manner known per se (see for example EP-A-405 216, EP-A-854171, DE-A 4220563, GB-PS 1078400, DE 197 01 489.5, DE 197 01 488.7, DE 198 34 804.5, DE 198 34 803.7, DE 198 34 802.9, DE 199 29 347.3, DE 199 39 865.8, DE 199 42 620.1, DE 199 42 614.7, DE 100 21 070.8, DE 100 38 488.9, DE 100 39 749.2, DE 100 52 287.4, DE 100 56 311.2 and DE 100 61 174.5). The use of CR, BR and NBR microgels in mixtures with double bond-containing rubbers is claimed in the patent (application)s EP-A 405 216, DE-A 4220563 and in GB-PS 1078400. In DE 197 01 489.5 the use of subsequently modified microgels in mixtures with double bond-containing rubbers such as NR, SBR and BR is described. Microgels are conveniently understood according to the invention to be rubber particles which are obtained in particular by crosslinking the following rubbers:

BR: polybutadiene,
ABR: butadiene/acrylic acid C1-4 alkyl ester copolymers,
IR: polyisoprene,
SBR: random styrene-butadiene copolymers with styrene contents of 1 to 60, preferably 5 to 50 percent by weight,
X-SBR: carboxylated styrene-butadiene copolymers
FKM: fluororubber,
ACM: acrylate rubber,
NBR: polybutadiene-acrylonitrile copolymers with acrylonitrile contents of 5 to 60, preferably 10 to 50 percent by weight,
X-NBR: carboxylated nitrile rubbers
CR: polychloroprene
IIR: isobutylene/isoprene copolymers with isoprene contents of 0.5 to 10 percent by weight,
BIIR: brominated isobutylene/isoprene copolymers with bromine contents of 0.1 to 10 percent by weight,
CIIR: chlorinated isobutylene/isoprene copolymers with bromine contents of 0.1 to 10 percent by weight,
HNBR: partially and fully hydrogenated nitrile rubbers
EPDM: ethylene-propylene-diene copolymers,
EAM: ethylene/acrylate copolymers,
EVM: ethylene/vinyl acetate copolymers
CO and
ECO: epichlorohydrin rubbers,
Q: silicone rubbers,
AU: polyester urethane polymers,
EU: polyether urethane polymers,
ENR: epoxydised natural rubber or mixtures thereof.

The uncrosslinked microgel starting products are conveniently produced by the following methods:
1. Emulsion polymerisation
2. Naturally occurring latices such as e.g. natural rubber latex can also be used.

In the composition according to the invention the microgels used are preferably ones that are obtainable by emulsion polymerisation and crosslinking.

In the production of the microgels used according to the invention by emulsion polymerisation, the following radically polymerisable monomers are used, for example: butadiene, styrene, acrylonitrile, isoprene, esters of acrylic and methacrylic acid, tetrafluoroethylene, vinylidene fluoride, hexafluoropropene, 2-chlorobutadiene, 2,3-dichlorobutadiene and double bond-containing carboxylic acids such as e.g. acrylic acid, methacrylic acid, maleic acid, itaconic acid, etc., double bond-containing hydroxyl compounds such as e.g. hydroxyethyl methacrylate, hydroxyethyl acrylate, hydroxybutyl methacrylate, amine-functionalised (meth)acrylates, acrolein, N-vinyl-2-pyrollidone, N-allyl urea and N-allyl thiourea, secondary amino(meth)acrylic acid esters such as 2-tert-butyl aminoethyl methacrylate and 2-tert-butyl aminoethyl methacrylamide, etc. The rubber gel can be crosslinked directly during emulsion polymerisation, for example by copolymerisation with polyfunctional compounds having a crosslinking action, or by subsequent crosslinking as described below. Direct crosslinking during emulsion polymerisation is preferred. Preferred polyfunctional comonomers are compounds having at least two, preferably 2 to 4 copolymerisable C=C double bonds, such as diisopropenyl benzene, divinyl benzene, divinyl ether, divinyl sulfone, diallyl phthalate, triallyl cyanurate, triallyl isocyanurate, 1,2-polybutadiene, N,N'-m-phenylene maleimide, 2,4-toluylene bis (maleimide) and/or triallyl trimellitate. Other possibilities are the acrylates and methacrylates of polyhydric, preferably dihydric to tetrahydric C2 to C10 alcohols, such as ethylene glycol, propanediol-1,2, butanediol, hexanediol, polyethylene glycol having 2 to 20, preferably 2 to 8 oxyethylene units, neopentyl glycol, bisphenol A, glycerol, trimethylol propane, pentaerythritol, sorbitol with unsaturated polyesters of aliphatic diols and polyols and maleic acid, fumaric acid and/or itaconic acid.

Crosslinking to form rubber microgels during emulsion polymerisation can also take place by continuing polymerisation until high conversions are obtained or in the monomer feed process by polymerisation with high internal conversions. Another possibility also consists in performing emulsion polymerisation in the absence of regulators.

The latices obtained in the emulsion polymerisation are ideally used for crosslinking the uncrosslinked or weakly crosslinked microgel starting products following emulsion polymerisation. Natural rubber latices can also be crosslinked in this way.

Suitable chemicals having a crosslinking action are, for example, organic peroxides such as dicumyl peroxide, t-butylcumyl peroxide, bis-(t-butylperoxyisopropyl)benzene, di-t-butyl peroxide, 2,5-dimethylhexane-2,5-dihydroperoxide, 2,5-dimethylhexyne-3,2,5-dihydroperoxide, dibenzoyl peroxide, bis-(2,4-dichlorobenzoyl)peroxide, t-butyl perbenzoate, and organic azo compounds, such as azo-bis-isobutyronitrile and azo-bis-cyclohexane nitrile, and di- and polymercapto compounds, such as dimercaptoethane, 1,6-dimercaptohexane, 1,3,5-trimercaptotriazine, and mercapto-terminated polysulfide rubbers such as mercapto-terminated reaction products of bis-chloroethylformal with sodium polysulfide.

The optimum temperature at which post-crosslinking is performed is naturally dependent on the reactivity of the crosslinker and it can be performed at temperatures from room temperature to approximately 180° C., optionally under elevated pressure (see in this connection Houben-Weyl, Methoden der organischen Chemie, $4^{th}$ Edition, Volume 14/2, page 848). Particularly preferred crosslinking agents are peroxides.

The crosslinking of rubbers containing C=C double bonds to form microgels can also take place in dispersion or emulsion with simultaneous partial, optionally complete, hydrogenation of the C=C double bond with hydrazine as described in U.S. Pat. No. 5,302,696 or U.S. Pat. No. 5,442,009 or optionally other hydrogenating agents, for example organometallic hydride complexes.

A particle expansion by agglomeration can optionally be performed before, during or after post-crosslinking.

In the production process used according to the invention, not completely homogeneously crosslinked microgels are preferably obtained, which can exhibit the aforementioned advantages.

Both unmodified microgels which substantially have no reactive groups, particularly at the surface, and modified microgels, microgels modified with functional groups, in particular surface-modified microgels, can be used as microgels to produce the composition according to the invention. The latter can be produced by chemical reaction of the already crosslinked microgels with chemicals that react with C=C double bonds. These reactive chemicals are in particular such compounds by means of which polar groups, such as e.g. aldehyde, hydroxyl, carboxyl, nitrile, etc., and sulfur-containing groups, such as e.g. mercapto, dithiocarbamate, polysulfide, xanthogenate, thiobenzothiazole and/or dithiophosphoric acid groups, and/or unsaturated dicarboxylic acid groups can be chemically bonded to the microgels. This also applies to N,N'-m-phenylenediamine. The aim of the microgel modification is to improve the microgel compatibility with the matrix, in order to obtain a good dispersibility during production and a good coupling.

Particularly preferred modification methods are grafting of the microgels with functional monomers and reaction with low-molecular-weight agents.

For grafting of the microgels with functional monomers, it is convenient to start from the aqueous microgel dispersion, which is reacted with polar monomers such as acrylic acid, methacrylic acid, itaconic acid, hydroxyethyl(meth)acrylate, hydroxypropyl(meth)acrylate, hydroxybutyl(meth)acrylate, acrylamide, methacrylamide, acrylonitrile, acrolein, N-vinyl-2-pyrollidone, N-allyl urea and N-allyl thiourea and secondary amino(meth)acrylic acid esters such as 2-tert-butylaminoethyl methacrylate and 2-tert-butylaminoethyl methacrylamide under the conditions of a radical emulsion polymerisation. Microgels having a core/shell morphology are obtained in this way, wherein the shell should exhibit a high compatibility with the matrix. It is desirable for the monomer used in the modification step to be grafted onto the unmodified microgel as quantitatively as possible. The functional monomers are conveniently added before complete crosslinking of the microgels.

The following reagents can be used in particular for a surface modification of the microgels with low-molecular-weight agents: elemental sulfur, hydrogen sulfide and/or alkyl polymercaptans, such as 1,2-dimercaptoethane or 1,6-dimercaptohexane, also dialkyl and dialkylaryl dithiocarbamate, such as the alkali salts of dimethyl dithiocarbamate and/or dibenzyl dithiocarbamate, also alkyl and aryl xanthogenates, such as potassium methyl xanthogenate and sodium isopropyl xanthogenate and the reaction with the alkali or alkaline-earth salts of dibutyl dithiophosphoric acid and dioctyl dithiophosphoric acid and dodecyl dithiophosphoric acid. The cited reactions can advantageously also be performed in the presence of sulfur, the sulfur being incorporated with formation of polydisulfide bonds. For the addition of this compound, radical initiators such as organic and inorganic peroxides and/or azo initiators can be added.

A modification of double bond-containing microgels such as e.g. by ozonolysis and by halogenation with chlorine, bromine and iodine is also possible. A further reaction of modified microgels such as e.g. production of hydroxyl group-modified microgels from epoxydised microgels is also understood as a chemical modification of microgels.

In a preferred embodiment the microgels are modified by hydroxyl groups, in particular also at the surface thereof. The hydroxyl group content of the microgels is determined by reaction with acetic anhydride and titration of the acetic acid released in that reaction with KOH in accordance with DIN 53240 as the hydroxyl value with the dimension mg KOH/g polymer. The hydroxyl value of the microgels is preferably between 0.1 and 100, more preferably between 0.5 and 50 mg KOH/g polymer.

The amount of modifying agent used depends on its efficiency and on the requirements specified in the individual case and ranges from 0.05 to 30 percent by weight, based on the total amount of rubber microgel used, 0.5 to 10 percent by weight based on the total amount of rubber gel being particularly preferred.

The modification reactions can be performed at temperatures from 0 to 180° C., preferably 20 to 95° C., optionally under a pressure of 1 to 30 bar. The modifications can be made on rubber microgels in bulk or in the form of their dispersion, wherein in the latter case inert organic solvents or water can be used as the reaction medium. The modification is particularly preferably performed in an aqueous dispersion of the crosslinked rubber.

The average diameter of the microgels produced can be set with a high degree of accuracy to for example 0.1 micrometer (100 nm)±0.01 micrometer (10 nm), such that for example a particle size distribution is achieved in which at least 75% of all microgel particles are between 0.095 micrometers and 0.105 micrometers in size. Other average diameters of the microgels, in particular in the range from 5 to 500 nm, can be established with the same accuracy (at least 75 wt. % of all particles lying around the maximum of the integrated particle size distribution curve (determined by light scattering) in a range of ±10% above and below the maximum) and used. In this way the morphology of the microgels dispersed in the composition according to the invention can be pinpointed almost exactly and hence the properties of the composition according to the invention and of the plastics, for example, produced from it can be set. The production of particularly finely dispersed microgels by emulsion polymerisation is carried out by controlling the reaction parameters in a manner known per se (see e.g. H. G. Elias, Makromoleküle, Vol. 2, Technologie, $5^{th}$ Edition, 1992, page 99 ff.).

The microgels produced in this way can be processed by, for example, evaporation, coagulation, co-coagulation with another latex polymer, freeze-coagulation (cf. U.S. Pat. No. 2,187,146) or by spray drying. In the case of processing by spray drying, commercial flow promoters such as e.g. $CaCO_3$ or silica can also be added.

The invention also concerns the vulcanised products that are obtainable by vulcanisation of the compositions according to the invention.

Vulcanisation of the compositions according to the invention is performed in the conventional way in suitable moulds at temperatures of preferably 120 to 200, preferably 140 to 180° C.

The invention thus also concerns a process for producing the vulcanised products which comprises the vulcanisation of the compositions according to the invention.

The invention also concerns the use of the vulcanisable composition according to the invention to produce vulcanised products, in particular to produce golf balls or roll coverings.

The invention also concerns golf balls comprising or consisting of the vulcanised product of the invention.

The invention also concerns table tennis bat coatings comprising the vulcanised product of the invention.

In these applications polybutadiene or natural rubber are used in particular as the matrix rubber.

Regarding the production of golf balls, reference can be made for example to the prior art mentioned at the start, which is referred to in full, such as U.S. Pat. No. 4,715,607.

The invention also concerns a roll comprising a covering comprising the vulcanised product of the invention and a machine, in particular a paper manufacturing machine or a machine for producing printed products, in particular printed paper products, which includes the cited roll. Finally the invention also concerns a process for producing paper products using the cited machine. In these applications nitrile rubber is used in particular as the matrix rubber.

The invention is further illustrated by the examples below.

EXAMPLES

Production Examples for the Microgels

The production of the microgels that were used in the other examples is described below:

Microgels A, B and C were produced by emulsion polymerisation, the following monomers being used: butadiene, styrene, trimethylol propane trimethacrylate (TMPTMA) and hydroxyethyl methacrylate (HEMA). The monomers used to produce the microgels and substantial constituents of the formulations are summarised in Table 1 below:

TABLE 1

| | Composition of the microgels used | | | | | | | | |
|---|---|---|---|---|---|---|---|---|---|
| | Water | | | Emulsifiers | | Monomers | | | |
| Microgel | Start [g] | Activation [g] | Stop [g] | Mersolat K30/95[1] [g] | TCD[2] (20%) [g] | Butadiene [g] | Styrene [g] | TMPTMA (90%) [g] | HEMA (96%) [g] |
| A (Tg = −75° C.) | 12608 | 287 | 530 | 137 | 250 | 3805.5 | 0 | 172 | 322.5 |
| B (Tg = −65° C.) | 13742 | 251 | 125 | 137 | 250 | 2740.5 | 304.5 | 105 | 350.0 |
| C (Tg = +40° C.) | 13742 | 251 | 125 | 137 | 250 | 787.5 | 2345.0 | 105 | 262.5 |

[1] Mersolat K30/95 ® (Bayer AG) are the Na salts of long-chain alkyl sulfonic acids (mixture of isomers). The content of active substance is 95 wt. %.
[2] Na salt of the reaction product of bis-hydroxy formylated dicyclopentadiene with hexahydrophthalic anhydride. An aqueous solution with 20 wt. % of active substance is used (the emulsifier was produced in accordance with: U.S. Pat. No. 5,100,945; inventor: A. Schmidt et al.; priority: 02.04.1991; laid open: 31.03.1992).

For the production of the microgels the amounts of emulsifiers Mersolat K30/95 and TCD specified in the table were first dissolved in water ("Start" column) and placed in a 40 liter autoclave. The autoclave was evacuated three times and pressurised with nitrogen. The monomers specified in the table were then added. The monomers were emulsified in the emulsifier solution with stirring at 30° C.

An aqueous solution consisting of 171 g of water, 1.71 g of ethylene diamine tetraacetic acid (Merck-Schuchardt), 1.37 g of iron(II) sulfate*$7H_2O$, 3.51 g of sodium formaldehyde sulfoxylate hydrate (Merck-Schuchardt) and 5.24 g of trisodium phosphate*$12H_2O$ was then added (the amount of water used for this is included in the amount of water specified in the table under "Start").

The reaction was started by the addition of 5.8 g of p-menthane hydroperoxide, 50% (Trigonox NT 50 from Akzo-Degussa), which was emulsified with 10.53 g of Mersolat K30/95 in half of the amount of water listed under "Activation".

After a reaction time of 2.5 hours the reaction temperature was increased to 40° C. After a further hour's reaction time, reactivation was performed with the same amount of initiator solution (NT50/water/Mersolat K30/95) as was used for the start of polymerisation. The polymerisation temperature was increased to 50° C. in this process.

When a polymerisation conversion of >95% was reached, polymerisation was terminated by the addition of 23.5 g of diethyl hydroxylamine. To this end diethyl hydroxylamine was dissolved in the amount of water listed in Table 1 under "Stop".

Unreacted monomers were then removed from the latex by stripping with steam.

The latex was filtered and mixed with stabiliser, coagulated and dried as in Example 2 of U.S. Pat. No. 6,399,706.

The gels were characterised both in the latex state using ultracentrifugation (diameter and specific surface area) and as a solid product with regard to solubility in toluene (gel content, swelling index/Si) by acidimetric titration (OH value and COOH value) and by DSC (glass transition temperature/Tg and Tg range).

The characteristic data of the microgels used in the examples are summarised in Table 2 below:

To determine the swelling index 250 mg of the microgel are swollen in 25 ml of toluene for 24 hours with shaking. The (wet) gel swollen with toluene is weighed after centrifuging at 20,000 rpm and is then dried to constant weight at 70° C. and weighed again.

OH Value (Hydroxyl Value)

The OH value (hydroxyl value) is determined in accordance with DIN 53240 and corresponds to the amount of KOH in mg that is equivalent to the amount of acetic acid released during acetylation with acetic anhydride of 1 g of substance.

TABLE 2

Properties of the microgels

| Microgel | Diameter | | | SSA [m$^2$/g] | Gel content [wt. %] | Swelling index | Tg [° C.] | Tg range [° C.] | OH value [mg$_{KOH}$/g$_{pol}$] | Acid value [mg$_{KOH}$/g$_{pol}$] |
|---|---|---|---|---|---|---|---|---|---|---|
| | d$_{10}$ [nm] | d$_{50}$ [nm] | d$_{80}$ [nm] | | | | | | | |
| A (Tg = −75° C.) | 43.5 | 50.9 | 55.7 | 127 | 91.7 | 13.1 | −75 | 15.2 | 33 | 7.4 |
| B (Tg = −65° C.) | 35.4 | 48.2 | 55.1 | 139 | 94.8 | 7.4 | −65.5 | 12 | 37.8 | 8.6 |
| C (Tg = +40° C.) | 30.7 | 40.3 | 46.1 | 146 | 94.2 | 6.4 | +37.5 | 34.6 | 34.6 | 9.6 |

The terms used in Table 2 have the meanings specified below:
SSA: Specific surface area in m$^2$/g
d$_z$: The diameter $\bar{d}_z$ is defined according to DIN 53 206 as the median or central value above and below which half of all particle sizes lie. The particle diameter of the latex particles is determined by ultracentrifugation (W. Scholtan, H. Lange, "Bestimmung der Teilchengrößenverteilung von Latices mit der Ultrazentrifuge", Kolloid-Zeitschrift und Zeitschrift für Polymere (1972) Vol. 250, No. 8). The diameters specified in the latex and for the primary particles in the compositions according to the invention are virtually identical since the particle size of the microgel particles remains virtually unchanged during production of the composition according to the invention.
Tg: Glass transition temperature
Tg Range (ΔTg)
A Perkin-Elmer DSC-2 is used to determine Tg and ΔTg.
Swelling Index
The swelling index Si was determined as follows:
The swelling index is calculated from the weight of the solvent-containing microgel swollen in toluene at 23° C. for 24 hours and the weight of the dry microgel.

Si=wet weight of the microgel/dry weight of the microgel.

Acid Value
The acid value is determined as already mentioned above in accordance with DIN 53402 and corresponds to the amount of KOH in mg that is necessary to neutralise one g of the polymer.
Gel Content
The gel content corresponds to the fraction undissolved in toluene at 23° C. It is determined as described above.
Glass Transition Temperature
The glass transition temperatures were determined as mentioned above.
Glass Transition Range
The glass transition range was determined as described above.
Production of the Vulcanised Mixtures:
The compositions shown in Tables 3 and 4 were mixed conventionally in a closed laboratory mixer and were vulcanised at 160° C. in a suitable mould. The specimens obtained underwent various physical tests (with the exception of the rebound height all parameters were measured in accordance with DIN methods; the rebound height was determined by analogy to a DIN method by determining the bounce height of rubber balls after the first impact from a height of 43 cm as a percentage of the starting height (mean of at least 9 individual measurements)), the results of which are likewise shown in Tables 3 and 4:

TABLE 3

| | | Example | | | | | | | |
|---|---|---|---|---|---|---|---|---|---|
| | | 1 phr | 2 phr | 3 phr | 4 phr | 5 phr | 6 phr | 7 phr | 8 phr |
| Polybutadiene | | 100 | 100 | 100 | 100 | 100 | 100 | 100 | 100 |
| Microgel A | | 0 | 0 | 5 | 10 | 15 | 10 | 15 | 15 |
| Zinc diacrylate | | 28 | 28 | 28 | 28 | 28 | 28 | 28 | 23 |
| Organic peroxide | | 1.2 | 1.2 | 1.2 | 1.2 | 1.2 | 1.2 | 1.2 | 1.2 |
| Zinc oxide | | 5 | 5 | 5 | 5 | 5 | 5 | 5 | 5 |
| Barium sulfate | | 0 | 10 | 0 | 0 | 0 | 10 | 10 | 0 |
| Carbon black N660 | | 0 | 10 | 0 | 0 | 0 | 10 | 10 | 0 |
| Zinc stearate | | 5 | 5 | 5 | 5 | 5 | 5 | 5 | 5 |
| Tests on mixture Rheometer experiment at 160° C. on Monsanto MDR 2000 P | | | | | | | | | |
| Incubation time t(i) | [min] | 0.34 | 0.32 | 0.34 | 0.35 | 0.33 | 0.33 | 0.34 | 0.32 |
| TC 10 | [min] | 0.34 | 0.31 | 0.33 | 0.34 | 0.32 | 0.31 | 0.32 | 0.31 |
| TC 90 | [min] | 1.72 | 1.19 | 1.44 | 1.51 | 1.31 | 1.14 | 1.15 | 1.51 |
| TC 95 | [min] | 2.41 | 1.64 | 2.02 | 2.09 | 1.9 | 1.57 | 1.57 | 2.12 |
| Mooney viscosity (ML 1 + 4) | [ME] | 41 | 45 | 39 | 39 | 41 | 43 | 45 | 41 |
| Tests on vulcanisate | | | | | | | | | |
| Density at RT | g/cm$^3$ | 1.069 | 1.149 | 1.064 | 1.061 | 1.055 | 1.133 | 1.130 | 1.040 |
| Shore A hardness | ShA | 93 | 94 | 93 | 92 | 91 | 93 | 92 | 87 |
| Impact resilience at 23° C. | % | 69 | 69 | 69 | 69 | 69 | 69 | 68 | 69 |
| Compression set, 24 h at 100° C. | % | 57 | 58 | 50 | 54 | 45 | 52 | 42 | 37 |
| Tensile experiment, immediate test at RT | | | | | | | | | |
| Tensile strength | MPa | 8.7 | 10.7 | 8.2 | 9.0 | 8.4 | 11.6 | 11.8 | 6.8 |
| Elongation at break | % | 43 | 50 | 43 | 50 | 56 | 60 | 70 | 58 |
| Rebound height at RT | % | 84 | 87 | 84 | 83 | 84 | 84 | 83 | 83 |

Notes on Table 3:
phr means "parts per hundred parts of rubber".
The polybutadiene was Buna CB 23, a neodymium-catalysed high-cis polybutadiene from Lanxess AG, Germany.
The zinc diacrylate was Sartomer 705 from Sartomer Co., USA.
The zinc oxide was zinc white WS from Heubach.
The barium sulfate came from Riedel de Haen.
Carbon black N660 came from Degussa.
The zinc stearate was zinc stearate from Faci.

The organic peroxide was Luperox 231 G40 (1,1-bis-(t-butylperoxy)-3,3,5-trimethylcyclohexane) from Atofina Chemicals.

The physical parameters were determined in accordance with the relevant DIN specifications. Additional reference can be made to Kleemann, Weber, Formeln und Tabellen für die Elastomerverarbeitung, Dr. Gupta Verlag, 1994.

Table 3 shows the following:

Examples 1 and 2 show the properties of the vulcanised mixtures without the microgels used according to the invention, with disadvantages in flow behaviour, processing reliability, density, hardness and compression set.

Examples 3 to 5 illustrate the influence of microgel A. It is clear that the properties of the mixture and the vulcanisate can be improved, in terms of t90, density, hardness, elongation at break, compression set for example, without properties such as t10, impact resilience, rebound height and tensile strength being adversely affected.

Mixtures 6 and 7 show the properties of combinations of microgel, barium sulfate and carbon black. Here the processing reliability (ti, t10), hardness, impact resilience and rebound height are retained, whilst the cycle time (t90, t95), density and compression set are reduced and at the same time the tensile strength and elongation at break increase significantly. These effects were surprising and not foreseeable.

In comparison to mixtures 1 and 5, mixture 8 shows that it is possible to reduce the amount of zinc diacrylate and thereby to reduce the density and hardness markedly, without this giving rise to disadvantages in processing reliability, impact resilience or rebound height.

TABLE 4

| | Example | | | | | | |
|---|---|---|---|---|---|---|---|
| | 9 phr | 10 phr | 11 phr | 12 phr | 13 phr | 14 phr | 15 phr |
| Polybutadiene | 100 | 100 | 100 | 100 | 85 | 85 | 85 |
| Zinc diacrylate | 28 | 28 | 28 | 28 | 28 | 28 | 28 |
| Organic peroxide | 1.2 | 1.2 | 1.2 | 1.2 | 1.2 | 1.2 | 1.2 |
| ZnO white seal | 5 | 5 | 5 | 5 | 5 | 5 | 5 |
| Barium sulfate | 0 | 0 | 0 | 0 | 0 | 0 | 0 |
| Carbon black N660 | 0 | 0 | 0 | 0 | 0 | 0 | 0 |
| Zinc stearate | 5 | 5 | 5 | 5 | 5 | 5 | 5 |
| Microgel A | 0 | 15 | 0 | 0 | 15 | 0 | 0 |

TABLE 4-continued

| | | Example | | | | | | |
|---|---|---|---|---|---|---|---|---|
| | | 9 phr | 10 phr | 11 phr | 12 phr | 13 phr | 14 phr | 15 phr |
| Microgel B | | 0 | 0 | 15 | 0 | 0 | 15 | 0 |
| Microgel C | | 0 | 0 | 0 | 15 | 0 | 0 | 15 |
| Tests on mixture | | | | | | | | |
| Rheometer experiment at 160° C. on Monsanto MDR 2000 P | | | | | | | | |
| Incubation time t(i) | [min] | 0.34 | 0.34 | 0.35 | 0.35 | 0.33 | 0.36 | 0.35 |
| TC 10 | [min] | 0.34 | 0.32 | 0.33 | 0.34 | 0.3 | 0.34 | 0.33 |
| TC 90 | [min] | 1.72 | 1.35 | 1.34 | 1.38 | 1.09 | 1.23 | 1.3 |
| TC 95 | [min] | 2.41 | 1.98 | 1.95 | 1.97 | 1.67 | 1.79 | 1.92 |
| ML 1 + 4 | [ME] | 41 | 42 | 42 | 40 | 45 | 42 | 39 |
| Tests on vulcanisate | | | | | | | | |
| Density at RT | g/cm³ | 1.069 | 1.053 | 1.053 | 1.060 | 1.069 | 1.071 | 1.081 |
| Shore A hardness | ShA | 93 | 92 | 93 | 95 | 93 | 94 | 96 |
| Impact resilience | % | 69 | 69 | 69 | 67 | 69 | 68 | 67 |
| Compression set, 24 h 100° C. | % | 57 | 49 | 47 | 45 | 47 | 53 | 54 |
| Tensile experiment, immediate test at RT | | | | | | | | |
| Tensile strength | MPa | 8.7 | 8.7 | 10.2 | 14.4 | 8.7 | 11.6 | 14.5 |
| Elongation at break | % | 43 | 47 | 61 | 54 | 41 | 48 | 42 |
| Rebound height at RT | % | 84 | 85 | 84 | 86 | 84 | 83 | 82 |

Examples 9 to 12 in Table 4 show that all microgels improve the processing reliability and at the same time reduce the cycle times. The density and compression set are reduced. The hardness, the impact resilience and the rebound height are substantially unchanged, whilst at the same time the tensile strength and elongation at break were greatly improved, such as is otherwise possible only by large additions of high-density additives.

Examples 13 to 15 show that, quite surprisingly, all microgels can also be used as a matrix substitute. This is most astonishing, because they are already fully crosslinked before being incorporated into the mixture. It is also surprising that the physical properties are only marginally influenced in this process.

In summary it can be seen that the compositions according to the invention provide vulcanised products having improved properties, making them suitable in particular for the production of golf balls or roll coverings.

The invention claimed is:

1. A vucanizable composition, comprising:
 a) at least one diene rubber,
 b) at least one unsaturated carboxylic acid or a salt thereof,
 c) at least one peroxide,
 d) at least one microgel; and
 f) a high-density additive comprising barium sulfate and carbon black,
  wherein upon the vulcanization of the vucanizable composition, a vulcanized product is thereby formed having a Mooney Viscosity (ML 1+4) of less than or equal to 47 and a Shore A Hardness at 70° C. of greater than or equal to 87.

2. The vucanizable composition according to claim 1, wherein the diene rubber is selected from the group consisting of:
 natural rubber (NR), styrene/isoprene/butadiene rubber (SIBR), polybutadiene rubber (BR), styrene/butadiene/acrylonitrile rubber (SNBR), polychloroprene (CR), butadiene/acrylic acid (ABR), C1-4 alkyl ester copolymers, polyisoprene (IR), random styrene-butadiene copolymers (SBR), carboxylated styrene-butadiene copolymers (X-SBR), fluororubber (FKM), acrylate rubber (ACM), polybutadiene-acrylonitrile copolymers (NBR), carboxylated nitrile rubbers (X-NBR), isobutylene/isoprene copolymers (IIR), brominated isobutylene/isoprene copolymers (BIIR), chlorinated isobutylene/isoprene copolymers (CIIR), ethylene/propylene copolymers (EPM), ethylene-propylene-diene copolymers (EPDM), ethylene/acrylate copolymers (EAM), ethylene/vinyl acetate copolymers (EVM), chlorohydrin rubber (CO), epichlorohydrin rubber (ECO), silicone rubbers (Q), polyester urethane polymers (AU), polyether urethane polymers (EU), epoxydised natural rubber (ENR), and mixtures thereof.

3. The vucanizable composition according to claim 1, wherein the diene rubber is polybutadiene.

4. The vucanizable composition according to claim 3, wherein the polybutadiene, has a cis content greater than 90%.

5. The vucanizable composition according to claim 1, wherein the unsaturated carboxylic acid or salt thereof is a metal diacrylate.

6. The vucanizable composition according to claim 1, wherein the unsaturated carboxylic acid or salt thereof is a metal dimethacrylate.

7. The vucanizable composition according to claim 1, wherein the unsaturated carboxylic acid or salt thereof is a zinc salt.

8. The vucanizable composition according to claim 1, wherein the peroxide is an organic peroxide.

9. The vucanizable composition according to claim 1, further comprising:
 e) at least one conventional rubber additive, said at least one conventional additive being present in the amount of up to 50 phr, and further wherein the at least one unsaturated carboxylic acids or salts thereof is present in the amount of 5 to 70 phr, the at least one peroxide is present in the amount of 0.2 to 5 phr, and the at least one microgel is present in the amount of 5 to 60 phr.

10. The vucanizable composition according to claim 1, wherein the microgel is a crosslinked microgel.

11. The vucanizable composition according to claim 1, wherein the microgel comprises primary particles and wherein said primary particles have an almost spherical geometry.

12. The vucanizable composition according to claim 11, wherein the primary particles have an average particle size of 5 to 500 nm.

13. The vucanizable composition according to claim 1, wherein the microgel comprises at least one fraction that that is insoluble in toluene at 23° C. of at least around 70 wt. %.

14. The vucanizable composition according to claim 1, wherein the microgel has a swelling index in toluene at 23° C. of less than around 80.

15. The vucanizable composition according to claim 1, wherein the microgel has a glass transition temperature of −100° C. to +100° C.

16. The vucanizable composition according to claim 1, wherein the microgel is obtained via emulsion polymerization.

17. The vulcanized product obtained by the vulcanization of the vulcanizable composition according to claim 1.

18. A process for producing the vulcanized product comprising:
vulcanizing the vulcanizable composition according to claim 1.

19. A golf ball comprising the vulcanized product according to claim 17.

20. A table tennis paddle-coating, comprising the vulcanized product according to claim 17.

21. A roll, comprising: a covering comprising the vulcanized product according to claim 17.

22. The composition according to claim 2, wherein the random styrene-butadiene copolymers have a styrene content of 1 to 60 percent by weight.

23. The composition according to claim 2, wherein the random styrene-butadiene copolymers, have a styrene content of 5 to 50 percent by weight.

24. The composition according to claim 2, wherein the polybutadiene-acrylonitrile copolymers have an acrylonitrile content of 5 to 60 percent by weight.

25. The composition according to claim 2, wherein the polybutadiene-acrylonitrile copolymers have an acrylonitrile content of 10 to 50 percent by weight.

26. The composition according to claim 2, wherein the isobutylene/isoprene copolymers, have an isoprene content of 0.5 to 10 percent by weight.

27. The composition according to claim 2, wherein the brominated isobutylene/isoprene copolymers, have a bromine content of 0.1 to 10 percent by weight.

28. The composition according to claim 2, wherein the chlorinated isobutylene/isoprene copolymers have a bromine content of 0.1 to 10 percent by weight.

29. The vucanizable composition according to claim 8, wherein the organic peroxide is selected from the group consisting of:
dicumyl peroxide, t-butylcumyl peroxide, bis-(t-butylperoxyisopropyl)benzene, di-t-butyl peroxide, 2,5-dimethylhexane-2,5-dihydroperoxide, 2,5-dimethylhexyne-3, 2,5-dihydroperoxide, dibenzoyl peroxide, bis-(2,4-dichlorobenzoyl)peroxide, t-butyl perbenzoate, 4,4-di-(t-butylperoxy)valeric acid butyl ester, and 1,1-bis-(t-butylperoxy)-3,3,5-trimethyl cyclohexane.

* * * * *